United States Patent
Acharya (10) Patent No.: US 6,356,276 B1
(45) Date of Patent: Mar. 12, 2002

(54) MEDIAN COMPUTATION-BASED INTEGRATED COLOR INTERPOLATION AND COLOR SPACE CONVERSION METHODOLOGY FROM 8-BIT BAYER PATTERN RGB COLOR SPACE TO 12-BIT YCRCB COLOR SPACE

(75) Inventor: Tinku Acharya, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/040,806

(22) Filed: Mar. 18, 1998

(51) Int. Cl.$^7$ .................................................. G09G 5/04
(52) U.S. Cl. ..................... 345/600; 345/589; 345/427; 345/604
(58) Field of Search ................................ 345/431, 153, 345/138, 150, 152, 154, 155, 427, 589, 600, 604, 606; 348/273, 242, 394, 220; 382/166

(56) References Cited

U.S. PATENT DOCUMENTS

| | | | |
|---|---|---|---|
| 3,971,065 A | 7/1976 | Bayer | 358/41 |
| 4,504,860 A | 3/1985 | Nicol | 358/133 |
| 4,630,307 A * | 12/1986 | Cok | 345/138 |
| 4,642,678 A * | 2/1987 | Cok | 282/165 |
| 5,065,229 A | 11/1991 | Tsai | 358/21 R |
| 5,237,402 A | 8/1993 | Deshon | 358/520 |
| 5,305,094 A | 4/1994 | Belmares-Sarabis | 348/651 |
| 5,373,322 A * | 12/1994 | Laroche et al. | 348/273 |
| 5,382,976 A | 1/1995 | Hibbard | 348/273 |
| 5,412,427 A * | 5/1995 | Rabbani et al. | 348/394 |
| 5,477,345 A | 12/1995 | Tse | 358/500 |
| 5,493,335 A * | 2/1996 | Parulski et al. | 348/233 |
| 5,506,619 A | 4/1996 | Adams, Jr. | 348/272 |
| 5,510,897 A | 4/1996 | Ishida | 358/310 |
| 5,526,054 A * | 6/1996 | Greenfield et al. | 348/467 |
| 5,544,284 A * | 8/1996 | Allenbach et al. | 345/431 |
| 5,602,654 A | 2/1997 | Patti | 358/461 |
| 5,652,621 A | 7/1997 | Adams, Jr. | 348/272 |
| 5,736,989 A * | 4/1998 | Lhotak | 345/431 |
| 5,805,217 A | 9/1998 | Lu | 348/273 |
| 5,828,406 A * | 10/1998 | Parulski et al. | 348/220 |
| 5,838,818 A * | 11/1998 | Herley | 382/166 |
| 5,841,422 A * | 11/1998 | Shyu | 345/154 |
| 5,889,554 A | 3/1999 | Mutze | 348/273 |
| 5,990,950 A * | 11/1999 | Addison | 348/273 |
| 5,991,465 A * | 11/1999 | Anderson et al. | 382/302 |
| 6,058,244 A | 5/2000 | Schweidler | 386/131 |

FOREIGN PATENT DOCUMENTS

| | | | | |
|---|---|---|---|---|
| EP | 0632663 A2 * | 1/1995 | | |
| EP | 0810778 A2 | 6/1997 | | H04N/5/202 |

OTHER PUBLICATIONS

James E. Adams, Jr., "Interactions Between Color Plane Interpolation and Other Image Processing Functions in Electric Photography", The International Society for Optical Engineering, vol.2416 Electronic Imaging '95, pp. 144–155 (Jul. 1995).

Benjamin Gordon et al.., "A Low–Power Multiplierless YUV to RGB Converter Based on Human Vision Perception", 1994, IEEE.

"Color Space Tutorial", Center for Innovative Computer Applications (Jun. 1994).

* cited by examiner

Primary Examiner—Chanh Nguyen
Assistant Examiner—Fritz Alphonse
(74) Attorney, Agent, or Firm—Blakely, Sookoloff, Taylor & Zafman LLP (57) ABSTRACT

An integrated color interpolation and color space conversion technique and apparatus. A raw image that is arranged in a Bayer pattern where each pixel has only one of the color components needed to form a full color resolution pixel may be converted using this technique directly to a YCrCb image space without any intermediate conversion or interpolation steps. Specifically, in one instance, an 8-bit Bayer pattern raw image may be converted directly to a 12-bit YCrCb space in a single step approach. Such an integrated technique may more readily and inexpensively implemented in hardware such as on a digital camera, or in software.

26 Claims, 8 Drawing Sheets

MEDIAN COMPUTATION-BASED INTEGRATED COLOR INTERPOLATION AND COLOR SPACE CONVERSION METHODOLOGY FROM 8-BIT BAYER PATTERN RGB COLOR SPACE TO 12-BIT YCRCB COLOR SPACE

BACKGROUND OF THE INVENTION

1. Field of the Invention

The invention relates generally to the field of graphics. More specifically, the invention relates to the field of digital imaging systems and software.

2. Description of the Related Art

In some digital cameras and imaging devices, the color information of a scene is captured by sub-sampling an image typically into three (Red, Green and Blue) color planes. In such cases, the original "raw image" is captured with each "raw image pixel" composed of only one of three vital color/intensity components: either R, G, or B (Red, Green, or Blue). But for image rendering display (such as to a monitor or printer), full color resolution, wherein each pixel is composed of a combination of R, G and B components, is desirable. Recovery of full color information from a sub-sampled raw image of single-color component raw image pixels is popularly known as color interpolation.

Figure 1A:
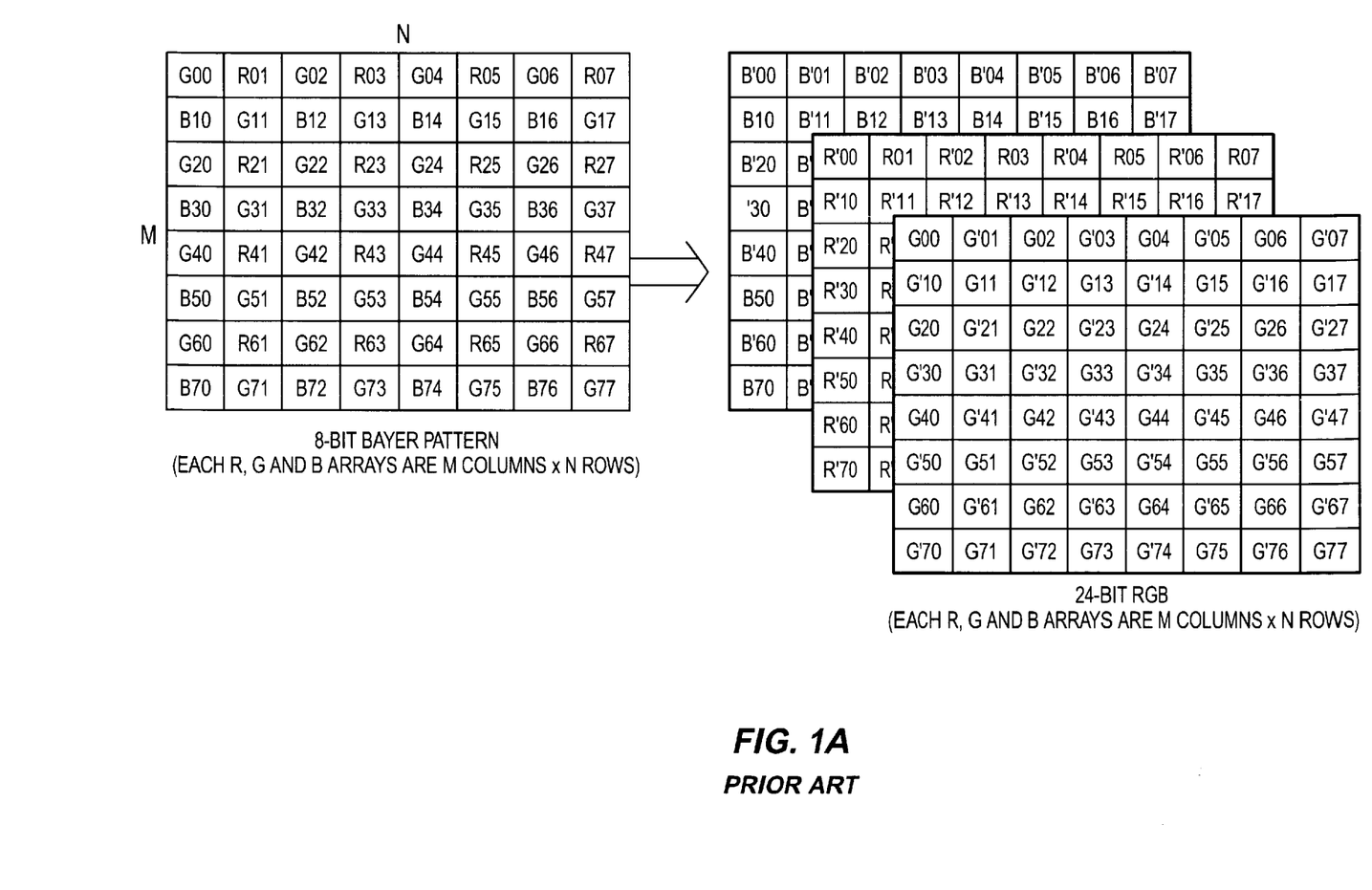
FIG. 1(a) shows 8-bit Bayer pattern RGB to 24-bit RGB conversion according to prior art.

The following description refers to raw image pixels as either "pixels" or "raw image pixels". Pixels that are formed by virtue of a completed color interpolation technique will be referred to as "full color pixels". In digital still and video cameras and certain other imaging devices, raw images are first represented as rectangular row and column of pixels with each pixel having the intensity value of a particular color plane only. In the case of RGB (Red, Green and Blue) sub-sampling imaging devices, images are obtained and stored in a particular pattern. FIG. 1(a) shows one such pattern, which is considered in describing the invention, known as the "Bayer" pattern. The Bayer pattern (see FIG. 1(a)), when three color planes are sub-sampled, is characterized by including on a first row of an image, alternating pixels of Red and Green, and then on a next row alternating pixels of Blue and Green. Thus, the Bayer pattern for the first four rows of pixels (with each pixel typically an 8-bit value) is as follows (with the rows thereafter repeating the same pattern):

```
G R G R G R ...
B G B G B G ...
G R G R G R ...
B G B G B G ...
        ⋮
```

As a result, each pixel location contains a value for a single color only. Assuming, as is the case in some imaging devices, that each pixel of the Bayer pattern has 8 bits of resolution (i.e., the pixel is a value representing the intensity of the color ranging from 0–255), then a "full color" pixel, one having R, G and B components would be a 24-bit value. To recover the two missing color components for each pixel, various methods of color interpolation or color recovery have been employed.

In color interpolation, an attempt is made to combine in some fashion neighboring pixel(s) to reconstruct, recover, or predict missing color component information for a given raw image pixel. Several prior art interpolation methods are described in "Interactions Between Color Plane Interpolation and Other Image Processing Functions in Electronic Photography", James E. Adams, Jr., SPIE, (The International Society for Optical Engineering), Vol. 2416 (Electronic Imaging '95), pages 144–155 (July 1995), with most of these employing pixel averaging techniques to recover missing color components. One notable exception to averaging-type technique are techniques based upon the median computation. The median computation can be described as follows. Consider an ordered set of values $\{X_1, X_2, X_3 \ldots X_N\}$ such that $X1 \leq X2 \leq \ldots X_N$. The function median $\{X_1, X_2, X_3 \ldots X_N\}$ would return a value M such that one-half of the values in the set are ranked below that value and the other half are ranked above. Thus, if N is odd, then median $\{X_1, X_2, X_3 \ldots X_N\}$ is $$x_{\frac{N+1}{2}}$$

and if N is even, then median $\{X_1, X_2, X_3 \ldots X_N\}$ is the value $$\left(x_{\frac{N}{2}} + x_{\frac{N}{2}}\right)/2,$$

or the average of the two middle values in the rank ordered set. By definition, the median computation involves sorting. An unordered set of values will hereinafter be designated by "( )" whereas an ordered set will be designated as "{ }".

When used in color recovery/interpolation, the median computation is used to select a value that more or less is actually present in the neighborhood of the pixel under consideration. By contrast, averaging can have the effect of introduction a value of a color component that is not present. The median computation is one way therefore to reduce noise introduced through color interpolation.

A median technique would interpolate the Red component of the captured Green pixel at row 2, column 2, (referring to the 8-bit Bayer pattern above) as the median of the two nearest red pixels, i.e., Red pixel at row 1, column 2 and the Red pixel at row 3, column 2. In this case, since only two pixels are involved, the median computation reduces to a simple average without need for sorting. Likewise, the Blue component of the same captured Green at row 2, column 2 would be interpolated under an median technique as the median of the two nearest Blue pixels, i.e., the pixel at row 2, column 1 and the Blue pixel at row 2, column 3. The Blue and Red interpolated components are then combined with the original captured Green value of the pixel, row 2, column 2 to form a new pixel which is a composite "full" color pixel. The resultant "RGB" full color pixel is an approximation or prediction of the original object/one's true color at that location in the captured image. FIG. 1(a) illustrates that to store the color interpolated image, three times the memory size of the original Bayer pattern image, would be required, assuming that each color plane component, R, G and B retains the same number of bits after interpolation.

Once each pixel of the image is at a full RGB color resolution (either through color interpolation or by virtue of having been captured at full color resolution), another process known as color space conversion may be performed. Depending on the rendering device or particular application for which the full color image is destined, the RGB "color space" (of an interpolated image, see FIG. (a)) may need to be converted. Certain imaging applications such as image editors or rendering devices such as printers do not use RGB color space in manipulating or rendering images. Instead they use different color spaces which may have the advantage of being more standardized or smaller in size. The RGB color space primarily indicates the levels of R, G and B in a pixel location and thus is a measure of the spectrum. An RGB color space image such as one resulting from color interpolating a Bayer pattern image also has both "chrominance" and "luminance" information although this information is less apparent. Luminance refers generally to the level of brightness in an image or pixel, whereas chrominance refers to the hue or placement of color in the color spectrum and saturation or intensity of that hue. In an RGB image, the Green color plane associated pixels contain most of the luminance information while Blue and Red associated pixels contain most of the chrominance information. This is due partly to the response of the human eye to recognize hue variations in the color Green over the colors Red and Blue, which are more associated in the human vision system with brightness or luminance levels. While a fully color interpolated RGB color space is excellent at representing the colors in an image, it is also three times larger in size that the original Bayer pattern (assuming for example an 8-bit to 24-bit color interpolation). Further, in an RGB color space image, the amount of Green is equivalent to the amount Red and Blue, and thus chrominance information may not be adequately represented. For these and other reasons, a color space known as YCrCb was developed.

Figure 1B:
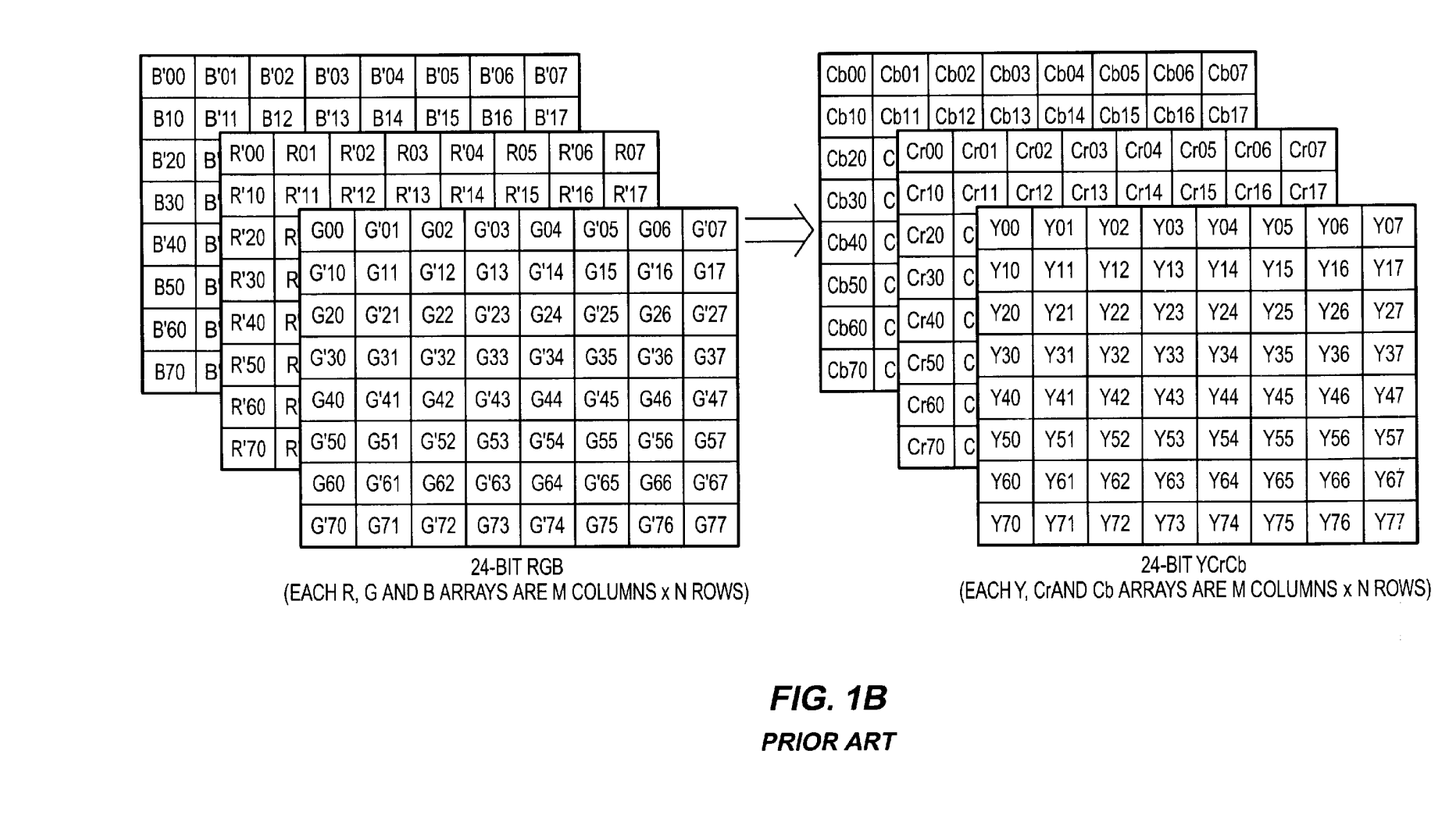
FIG. 1(b) shows 24-bit RGB to 24-bit YCrCb conversion according to prior art.
Figure 1C:
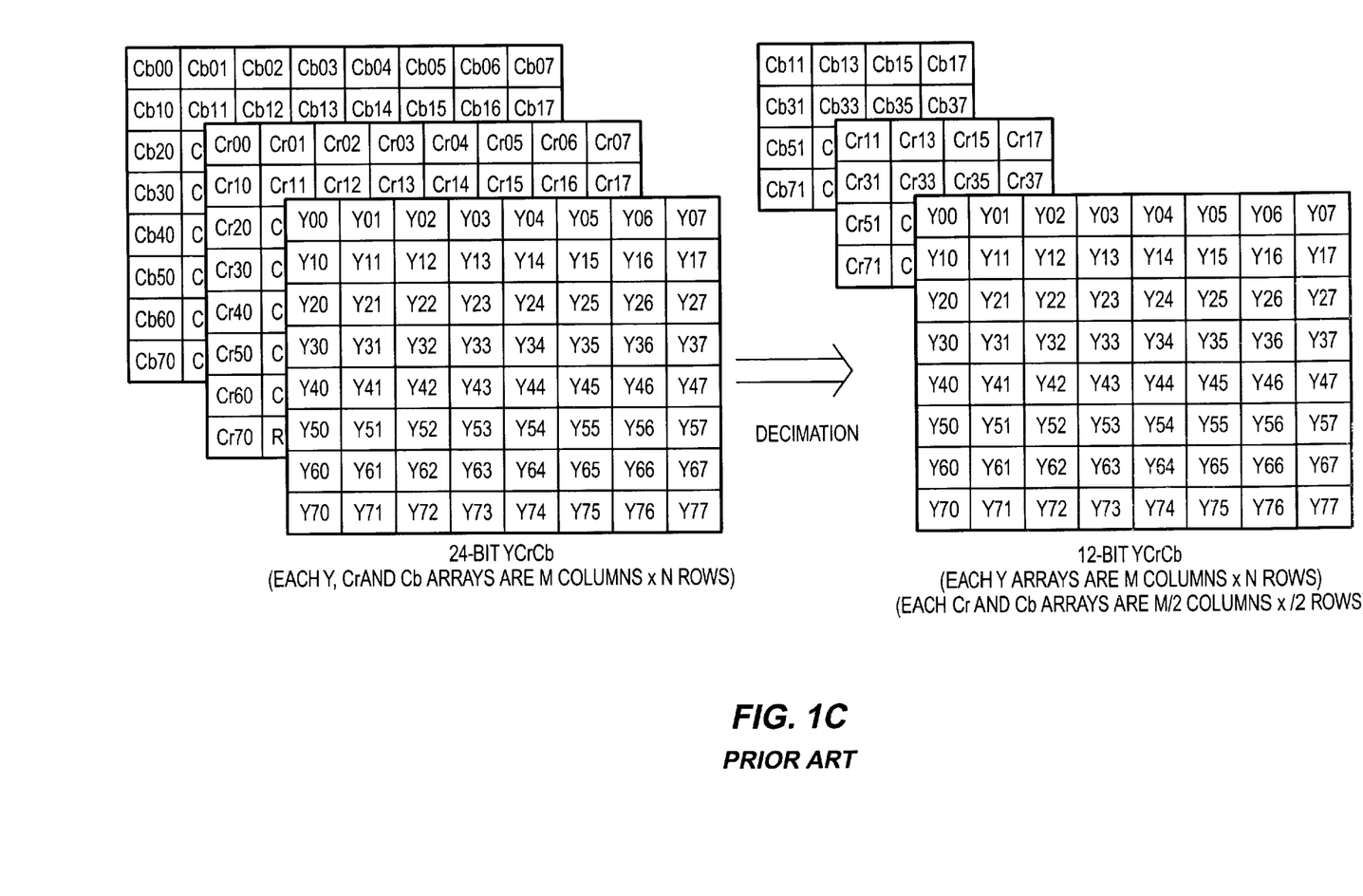
FIG. 1(c) shows 24-bit YCrCb to 12-bit YCrCb conversion according to prior art.

YCrCb is a digital color system defined by the CCIR (*International Consultative Committee on Broadcasting*) and is also referred to as the CCIR 601 color space. YCrCb defines color images information in terms of luminance (Y component) and two different chrominance values (Cr-- chrominance of Red colors and Cb--chrominance of Blue colors) rather than as a combination of the spectrum like the RGB space. When each pixel is thus represented, unlike the RGB color space where each pixel typically has 24 bits of information (8 bits for each color plane), each pixel can be represented by only 12 bits. This process is more fully described below, but requires an intermediate step where each first pixel has 24-bit YCrCb information and then is decimated to reduce the set to 12-bit values on the average. FIG. 1(b) illustrates the processing step where the 24-bit RGB space is converted into a 24-bit YCrCb space. As seen in FIG. 1(b), the prior art necessitates using a storage array three times the size of the 8-bit Bayer pattern original image. After the 24-bit YCrCb color space is obtained, every other pixel of Cr and Cb components must be decimated row wise and column wise such that only one in four pixels still has all three components. The other three pixels out of four have only the Y component in the 12-bit (so called because the pixels on average have 12-bits of information) YCrCb space. FIG. 1(c) shows this transformation.

Traditionally, the process of color interpolation and color space conversion have been independently performed. First, a raw image is color interpolated. When it is stored or transferred it may also be first compressed or encoded. Second, the process of color space conversion ordinarily occurs in software or in application separate from the imaging system performing the image capture. Often, even color interpolation is performed in software. If performed in hardware, for instance, on a digital camera device, the process of color interpolation would demand a storage array of 24-bits multiplied by the size (number of rows and columns of pixels) of the image.

Color interpolation and color space conversion also both involve a set of computations. In the case of color interpolation, these computations may constitute equal- weight averaging, according to one traditional color interpolation technique, of neighboring raw image pixels. In the case of color space conversion a transformation matrix is utilized to convert each pixel from an RGB color space value to a YCrCb value. This transformation matrix usually consists of nine values determined by a 3×3 conversion matrix. After this transformation matrix is applied, the YCrCb values are decimated to reduce the final image to an average of 12 bits.

It would be desirable to design and provide a technique that integrates the operation of color interpolation and color space conversion into a single operation. Such a technique is advantageous in that a smaller storage array size, one sufficient to hold the 12-bit YCrCb information, rather than the full 24-bit RGB and 24-bit YCrCb information, could be implemented. Further, in a digital camera where color interpolation is performed on-camera, it may be desirable to also perform color space conversion in an integrated manner so that the overall computational complexity and time, as well as image memory size can all be reduced.

SUMMARY OF THE INVENTION

What is disclosed is a method including the steps of (1) providing an integrated color space conversion and color interpolation technique, and (2) applying that technique to pixels of a raw image, the raw image pixels without full color resolution, the technique generating therefrom a color interpolated image in a different color space.

BRIEF DESCRIPTION OF THE DRAWINGS

The objects, features and advantages of the method and apparatus for the present invention will be apparent from the following description in which.

DETAILED DESCRIPTION OF THE INVENTION

Referring to the figures, exemplary embodiments of the invention will now be described. The exemplary embodiments are provided to illustrate aspects of the invention and should not be construed as limiting the scope of the invention. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware or combinations thereof.

Figure 2:
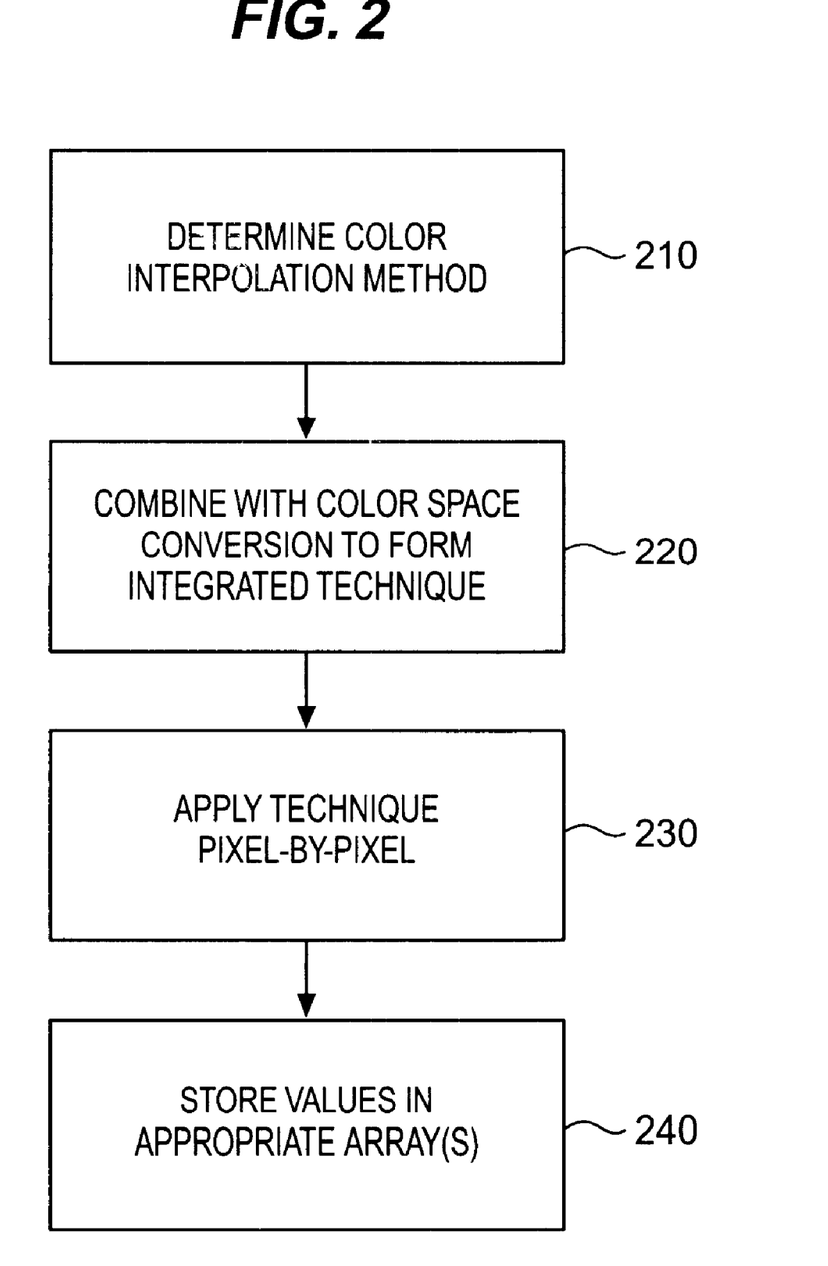
FIG. 2 is a flow diagram describing the basic methodology and design basis for at least one embodiment of the invention.

FIG. 2 is a flow diagram describing the basic methodology and design basis for at least one embodiment of the invention.

In imaging technology, there are many methods for color interpolation or recovery. When attempting to integrate the process of color space conversion with color interpolation, the color interpolation technique to be represented in the integrated technique should be compatible with the color space conversion process. One often used method of color interpolation is known as near median computation interpolation. In such a method, a missing color component for a given pixel location is determined by determining the median of the adjacent and/or neighboring pixels that are also associated with that missing color. Referring to the Bayer pattern of FIG. 1(a), the pixel location (0,1) (row, column) of the raw image has the value R01 which is a Red color plane associated value. In the Bayer pattern, the Green color plane component and Blue color plane components are missing for location (0,1). To interpolate the Green color component G'01, one method of color interpolation would take the median of adjacent Green color plane associated pixel values which are, for instance, G00, G11 and G02. Thus G'01 might be determined by determining the median of the set (G00+G11+G02). Likewise, the missing Blue color plane component B'01 (location (0,1)) would be interpolated as the median of adjacent Blue color plane associated pixel values B10 and B12 which reduces to the average—(B10+B12)/2. Median techniques may also consider not only adjacent but neighboring non-adjacent pixels as well. Since there are many methods of color interpolation known in the art of imaging, a suitable one may be chosen for the application or implementation desired. Thus, according to step 210, in integrating color space conversion and color interpolation, a suitable color interpolation method should be determined. Then the interpolation method can be combined with a color space conversion technique (step 220).

For instance, when converting from RGB color space to the YCrCb color space, a set of conversion equations are defined such that for a given pixel location (i,j) each component Y, Cr and Cb is a linear combination of R, G and B components. One such set of equations is given below:

$$Y_{i,j} = 0.299 * R_{i,j} + 0.587 * G_{i,j} + 0.114 * B_{i,j}$$

$$Cr_{i,j} = -0.169 * R_{i,j} - 0.331 * G_{i,j} + 0.5 * B_{i,j}$$

$$Cb_{i,j} = 0.5 * R_{i,j} - 0.419 * G_{i,j} - 0.091 * B_{i,j}$$

This set of equations generates for every RGB value a corresponding YCrCb value for a given pixel location. Color space conversion may be achieved using other coefficients than those given above which are merely exemplary of one conversion matrix used in the art. The above equations for RGB to YCrCb conversion assumes that each pixel location already has a full color resolution, i.e., an R, G and B component. To progress from the CFA raw image directly to YCrCb, therefore, the color interpolation method chosen must be combined with color space conversion transform (step 220). If the same precision (i.e., number of bits) used to store the R, G and B values is used for the Y, Cr And Cb values, then the total size of the storage needed for the YCrCb image space would be the same. Thus, in an M by N image of 8-bit R, G and B values for each pixel, a total storage size of M*N*24 bits would be required. When this is converted to a full resolution YCrCb space, again the needed storage size would be M*N*24 bits (each pixel having 8 bit Y, Cr and Cb values).

In converting to the YCrCb color space, a further reduction is often performed to reduce the total storage size to M*N*12 bits. Hence, in this reduced form, the color space is referred to as a 12 bit YCrCb space. The integrated conversion described herein exemplifies application of the FIG. 2 methodology derive a technique to convert directly from an 8-bit per pixel raw image Bayer pattern (prior to color interpolation which yields 24-bit RGB values for each pixel). With an integrated technique, the need for a large storage array of M*N*24 bits is eliminated as is the complication of decimating a 24-bit YCrCb space into a 12-bit YCrCb space.

To combine color space conversion with color interpolation in this manner, a technique must be defined that combines the median determination of neighboring pixels for color interpolation and then converts and decimates simultaneously. The technique should be able to applied pixel-by-pixel (step 230) in a single pass method. Then, the 12-bit YCrCb values can be stored directly into array(s) pixel-by-pixel (step 240). Further as will be discussed below, since the values for each color plane are stored separately, the size of the Cr and Cb storage arrays may be defined/designed to be ¼ the size of the Y storage array. Thus, the integrated technique is advantageous in needing a smaller amount of storage.

Figure 3:
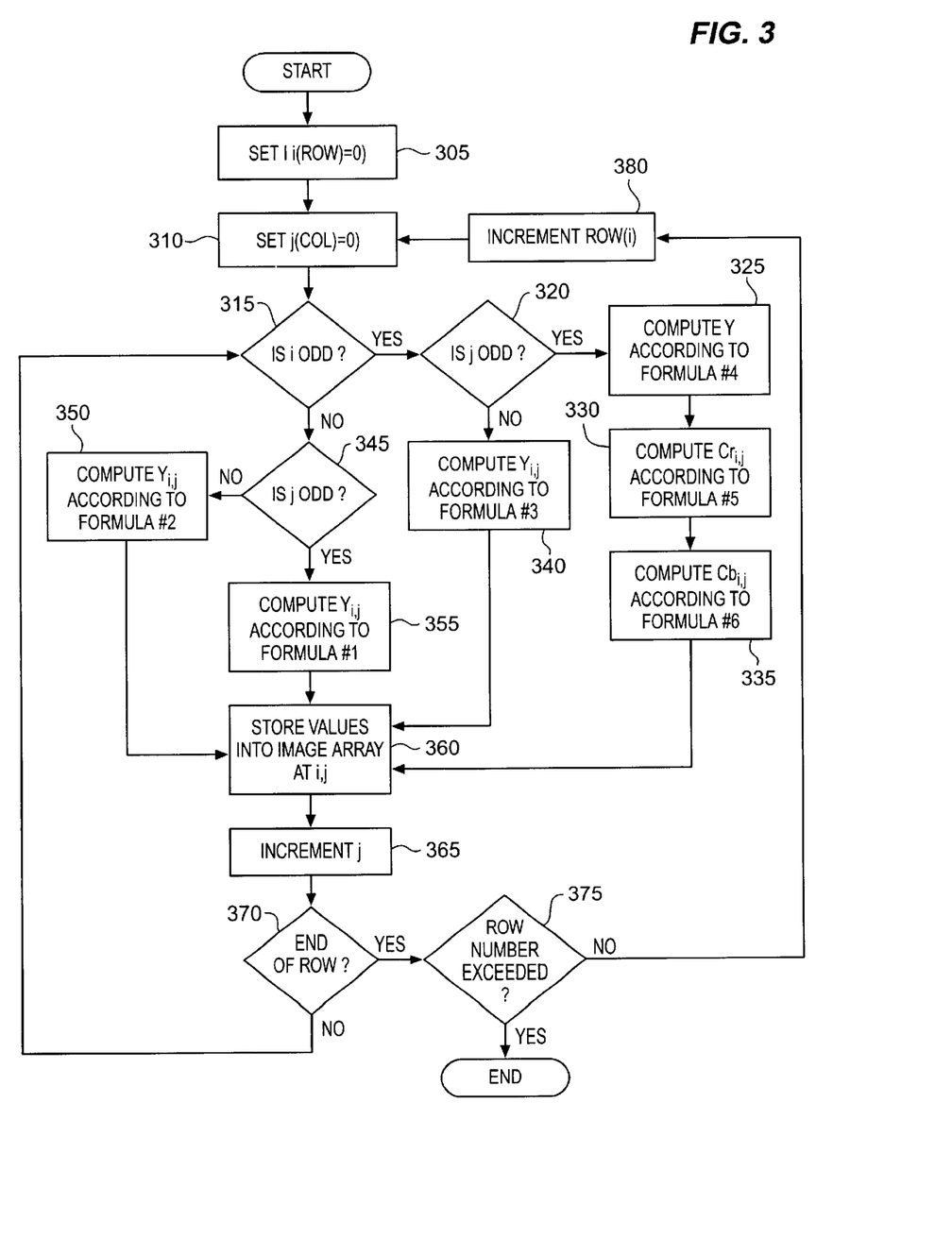
FIG. 3 is a flow diagram according to one embodiment of the invention.

FIG. 3 is a flow diagram according to one embodiment of the invention.

FIG. 3 shows that depending upon the row and column position of the pixel undergoing integrated conversion and interpolation, the formula or conversion algorithm employed will vary. This is due in large part to the repeating nature of the raw image in a Bayer pattern which has alternating rows and columns of pixels, each associated with certain color planes. Referring to FIG. 1(a), the first row of the Bayer pattern has pixels which in each column alternate between association with the Green and Red color planes. The next or second row of pixels alternate between the Blue and Green color planes. On the third row, the pattern is the same as the first row, and so on. When performing median computation color interpolation, both the number and location of neighboring pixels utilized to derive missing color components varies. Given a pixel Pij (or $P_{i,j}$), where "i" represents the row number and "j" the column number and P the color plane association of that location in the original raw image Bayer pattern, the location (i,j), which is determinative of what color plane component is already present in the raw image pixel, determines how to extract the "set" i.e., the pixel values used in determining the median.

For example, referring to FIG. 1(a), the Red color plane associated pixel R43 is missing Green and Blue color plane components. The Green component G'43 for the location (4,3) in the image array can be determined in a median interpolation technique as the median of Green neighbors G33, G42, G44 and G53. Likewise, the Blue component B'43 for the location (4,3) in the image array may be interpolated as the median of B32, B34, B54 and B52. In this manner, the three color plane components R, G and B, will form the pixel location (4,3) in the color interpolated RGB space image. The above determination can be generalized such that for any Red color plane associated pixel Rij in the raw image Bayer pattern, the interpolated components are $$B'ij = \text{median}(B_{i-1,j-1}, B_{i-1,j+1}, B_{i+1,j-1}),$$

and $$G'ij = \text{median}(G_{i-1,j}, G_{i+1,j}, G_{i,j-1}, G_{i,j+1}).$$

Likewise, generalizations may be made for raw image pixels Bij such that:
for $$B_{ij}, G'_{ij}=\text{median}(G_{i-1,j}, G_{i+1,j}, G_{i,j-}, G_{i,j+1}),$$

and $$R'_{ij}=\text{median}(R_{i-1,j-1}, R_{i-1,j+1}, R_{i+1,j+1}, R_{i+1,j-1}).$$

For Gij, there are two possibilities. In a Bayer pattern, Green associated pixels either accompany a row along with Red color plane associated pixels or Blue color plane associated pixels. This dichotomy can be translated in terms of the nature of the coefficients "i" and "j" themselves. When "i" and "j" are both odd, for each such Gij, B'ij=median($B_{i,j-1}$, $B_{i,j+1}$) or ($B_{i,j-1}$, $B_{i,j+1}$)/2 and R'ij=median($R_{i-1,j}$, $R_{i+1,j}$) or ($R_{i-1,j}$, $R_{i+1,j}$)/2. When "i" and "j" are both even, for each such Gij, B'ij=median($B_{i-1,j}$, $B_{i+1,j}$) and R'ij=median($R_{i,j-1}$, $R_{i,j+1}$). As noted above, the median of any two values ($X_1$, $X_2$) can also be expressed simply ($X_1+X_2$)/2.

Because Green color plane associated pixels actually represent chrominance information in the Bayer pattern, surrounding Green pixels are considered and an interpolation made even though the pixel is already Green. For any Green pixel, Gij, its Green component value is actually estimated/interpolated as:

$$G'_{ij}=\text{median}(G_{i-1,j-1}, G_{i-1,j+1}, G_{ij}, G_{i+1,j-1}, G_{i+1,j+1}).$$

The above generalized equations will interpolate missing and Green color components for the raw image pixels arranged in the Bayer pattern. When the raw image is in some other pattern, the above equations may be easily modified as needed by one of ordinary skill in the art. These deterministic equations for color interpolation can be combined algebraically with the YCrCb color space conversion equations given above. Thus, for a location Rij in the CFA that already has a Red color plane associated component, Yij may be mapped as:

$$Y_{i,j}0.299*R_{i,j}+0.587*\text{median}\{G_{i-1,j}, G_{i+1,j}, G_{i,j-1}, G_{i,j+1}\}+0.114*\text{median}\{B_{i-1,j-1}, B_{i-1,j+1}, B_{i+1,j-1}, B_{i+1,j+1}\}$$

This direct substitution into the 24-bit RGB (each pixel with all three components) to 24-bit YCrCb equations given above does not give an integrated solution in and of itself. The end result that the technique should achieve is a 12-bit YCrCb image space. To achieve this in the prior art, a procedure of decimation is applied wherein the Cr and Cb values are dropped in alternate rows and columns. As a result of this decimation, only one of every four pixels has full YCrCb information, while the other three pixels of the four retain only the Y component. If each component Y, Cr and Cb, have an 8-bit representation or precision, then three pixel locations out of four have 8 bits of information, while the fourth has a full 24 bits. The average number of bits for each pixel of those four is (8+8+8+24)/4 or 12 bits. When the 24-bit YCrCb space is decimated thus, it is known as a 12-bit YCrCb space not because each pixel has 12 bits of information but because each pixel has 12 bits on the average. This principle is further illustrated in FIG. 4.

One advantage of an integrated color interpolation and color space conversion technique is the ability to eliminate the need for decimation by considering only the relevant components during the technique. In so doing, decimation or the procedure of computing pixels that are only later to be discarded is avoided. This increases greatly the ability to deliver the converted image space quicker and in a more compute-efficient manner. When implemented in hardware, it further removes the need for the set of control circuitry that would be required to carry out decimation. Since there are in the original Bayer pattern image four different generalized equations for determining missing color components, the integrated technique is also split into four cases. Using algebraic substitution and disregarding components that would ordinarily undergo decimation, the following integrated technique may be obtained according to at least one embodiment of the invention:

("Row Numbers" refers to the maximum row number, while "Column Number" refers to the maximum column number. In an M by N image, RowNumber=M while ColumnNumber=N.
begin
  for (i=0 to RowNumber-1 && j=0 to ColumnNumber-1)
    case 1 (i is even and j is odd): [Formula #1]
      $Y_{i,j}=0.2999*R_{i,j}+0.587*\text{median}(G_{i-1,j},G_{i+1,j},G_{i,j-1},G_{i,j+1})+0.114*\text{median}(B_{i-1,j-1},B_{1-1,j+1},B_{i+1,j-1},B_{i+1,j+1})$
    case 2 (both i and j are even): [Formula #2]
      $Y_{i,j}=0.1495(R_{i,j-1}+R_{i,j+1})+0.587*\text{median}(G_{i-1,j-1},G_{i+1,j+1},G_{i,j},G_{i+1,j-1},G_{i+1,j+1})+0.0.057(B_{i-1,j}+B_{i+1,j})$
    case 3 (i is odd and j is even): [Formula #3]
      $Y_{i,j}=0.299*\text{median}(R_{i-1,j-1},R_{i-1,j+1},R_{i+1,j-1},R_{i+1,j+1})+0.587\text{median}(G_{i-1,j},G_{i+1,j},G_{i,j-1},G_{i,j+1})0.114B_{i,j}$
    case 4 (both i and j are odd): [Formula #4, #5 and #6]
      $Y_{i,j}0.1495(R_{i-1,j}+R_{i+1,j})+0.587*\text{median}(G_{i-1,j-1},G_{i-1,j+1},G_{i,j},G_{i+1,j+1})+0.057(B_{i,j-1}+B_{i,j+1})$
      $Cr_{i,j}=-0.0845(R_{i-1,j}+R_{i+1,j})-0.331*\text{median}(G_{i-1,j-1},G_{i-1,j+1},G_{i,j},G_{i+1,j-1},G_{i+1,j+1})+0.250(B_{i,j-1}+B_{i,j+1})$
      $Cb_{i,j}=0.250(R_{i-1,j}+R_{i+1,j})-0.419*\text{median}(G_{i-1,j-1},G_{i-1,j+1},G_{i,j},G_{i+1,j-1},G_{i+1,j+1})-0.0405(B_{i,j-1}+B_{i,j+1})$
  end for
end.

The implementation of this four case technique is embodied in the flow diagram of FIG. 3. Due to the repeating nature of the Bayer pattern, the row and column position of the pixel location will indicate which of the four cases are applicable, and consequently, which formulas are to be utilized in determining the Y, Cr or Cb components as needed.

In implementing the above technique, the row and column position indicators, "i" and "j" respectively, are first initialized to zero (steps 305 and 310) and incremented thereafter as appropriate. The position (0,0) indicates the upper left most pixel location in the image array (see FIG. 1(a)). If "i" is odd (checked at step 315) and "j" is not odd, i.e., even (checked at steps 315 and 320, respectively) then only the Y component as determined in Formula #3 above is computed (step 340). If "i" is odd and "j" is odd (checked at steps 315 and 320, respectively), then all three components, Y, Cr and Cb must be determined. This represents the one pixel out of four in the resulting YCrCb image space that will have 24 bits (8 bits for each of three Y, Cr and Cb components). Thus, when "i" and "j" are both odd, Yij is determined according to Formula #4 (step 325). Additionally, in this case, Crij is determined according to Formula #5 (step 330) and Cbij is determined according to Formula #6 (step 335).

If "i" is not odd, but even (checked at step 315), and if "j" is odd (checked at step 345), then Yij is determined according to Formula #1 (step 355). If "i" is even and "j" is even, then Yij is determined according to Formula #2 (step 350).

For pixels that have a row position and column position that is both odd, all three components—Y, Cr and Cb—are determined and for all other pixels, only the Y component is determined. This avoids the need for decimation since the values are computer/determined nor stored as they are in the prior art. Once the relevant component(s) for a pixel is/are determined, then the value(s) are stored into the appropriate image array (step 360). In one embodiment of the invention, the Y values are all stored in one array while the Cr and Cb values are stored in their own separate arrays. Since only one in four pixels has Cr and Cb components, those arrays are ¼ the size of the Y array, or ¼ the size as the raw image Bayer pattern (see FIG. 4).

Once the values are stored, "j" or the column position, is incremented. If the end of the row is reached (checked at step 370) then the row position "i" is incremented (step 380) provided that the row number will not have exceeded the maximum row number (checked at step 375). After the row position is incremented, the column position "j" is reset to zero (step 310). This resets the start of a new row. If the end of the row is not reached, then the current pixel location is processed. In this manner, a row by row scanning and processing of pixels is achieved. For each pixel location in the image array, a single-pass is sufficient to convert to a YCrCb space. This single integrated technique can be implemented in hardware, software, firmware or a combination thereof.

Figure 4:
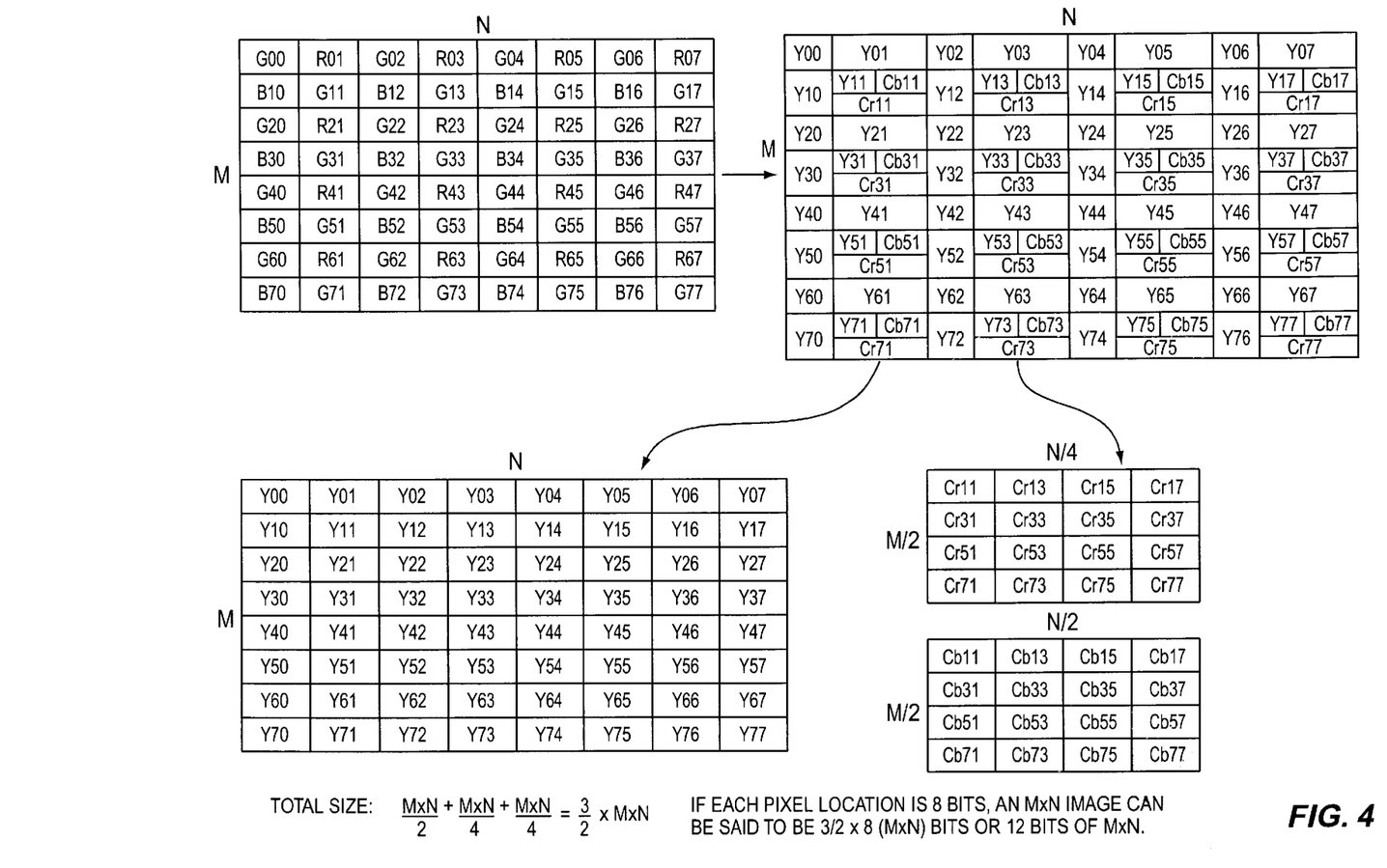
FIG. 4 illustrates the operation of the single pass integrated color space conversion and color interpolation technique.

FIG. 4 illustrates the operation of the single pass integrated color space conversion and color interpolation technique. An 8-bit Bayer pattern (where each pixel location has only one 8-bit value associated either with R, G or B color planes) raw image can be directly transformed into a 12-bit YCrCb image using the integrated technique described according to various embodiments of the invention. All intermediate steps necessary in the prior art (see FIG. 1(*a*) through FIG. 1(*c*)) are eliminated. The size of the original Bayer pattern image is M rows by N columns multiplied by 8-bits. The 12-bit YCrCb image is peculiar in that only one in four pixels have all three components Y, Cr and Cb. The other pixels out of four have only the Y component. Assuming that each component has an 8-bit representation, this means that three pixels are 8-bits long and one pixel is 24 bits. This averages to 12-bits for the four pixels. Thus, the YCrCb space converted to is known as a 12-bit space.

This is further evident when the component planes, Y, Cr and Cb are considered separately. The Y plane is a full M*N*8-bits in size since each pixel has a Y component in the reduced component space. The Cr and Cb planes are each dimensions of M/2 by N/2. Thus, the total storage space required is M*N (for the Y component array), M*N/4 (for the Cr component array) and M*N/4 (for the Cb component array). Thus, a total of 3/2*M*N values need to be stored. Assuming that each value in the array is represented in 8-bits, the M*N image has 3/4*8 or 12 bits per pixel (average) in the M by N image array. Due to the repeated nature of the technique and of the original Bayer pattern, zero values for locations without Cr or Cb components do not need to be stored in the Cr and Cb component arrays, since the position of those values in the full image array is predetermined. For example, the first Cr array entry is Cr11 corresponding to position (1,1) in the image array when reconstituted. The value to its immediate right on the same row must be Cr13, since this is the next location in the full M*N array that has a Cr value. By translating the physical row and column position of values in the Cr and Cb arrays, the relative row and column position in the full size image array may be determined. Assume that (l,m) is the (row, column) position in the Cr and Cb arrays ranging from a value of 0 to M/2−1 for the row position and 0 to N/2−1 for the column position. Then (i,j), the position of the component in the full size array where "i" ranges from 0 to M−1 and "j" from 0 to N−1, may be expressed as:

$i=l*2+1$ $j=m*2+1$

By directly converting a Bayer pattern image into a YCrCb format, the many intermediate steps when color interpolation and color space conversion are performed separately are avoided. Further, as shown in FIG. 4, the corollary need to store M*N*24 bits of information for an M*N image is eliminated. In this integrated technique from a Bayer pattern image directly to a 12-bit YCrCb space image, the total image related storage needed is M*N*12 bits, which is ½ the storage needed in prior art techniques.

Figure 5:
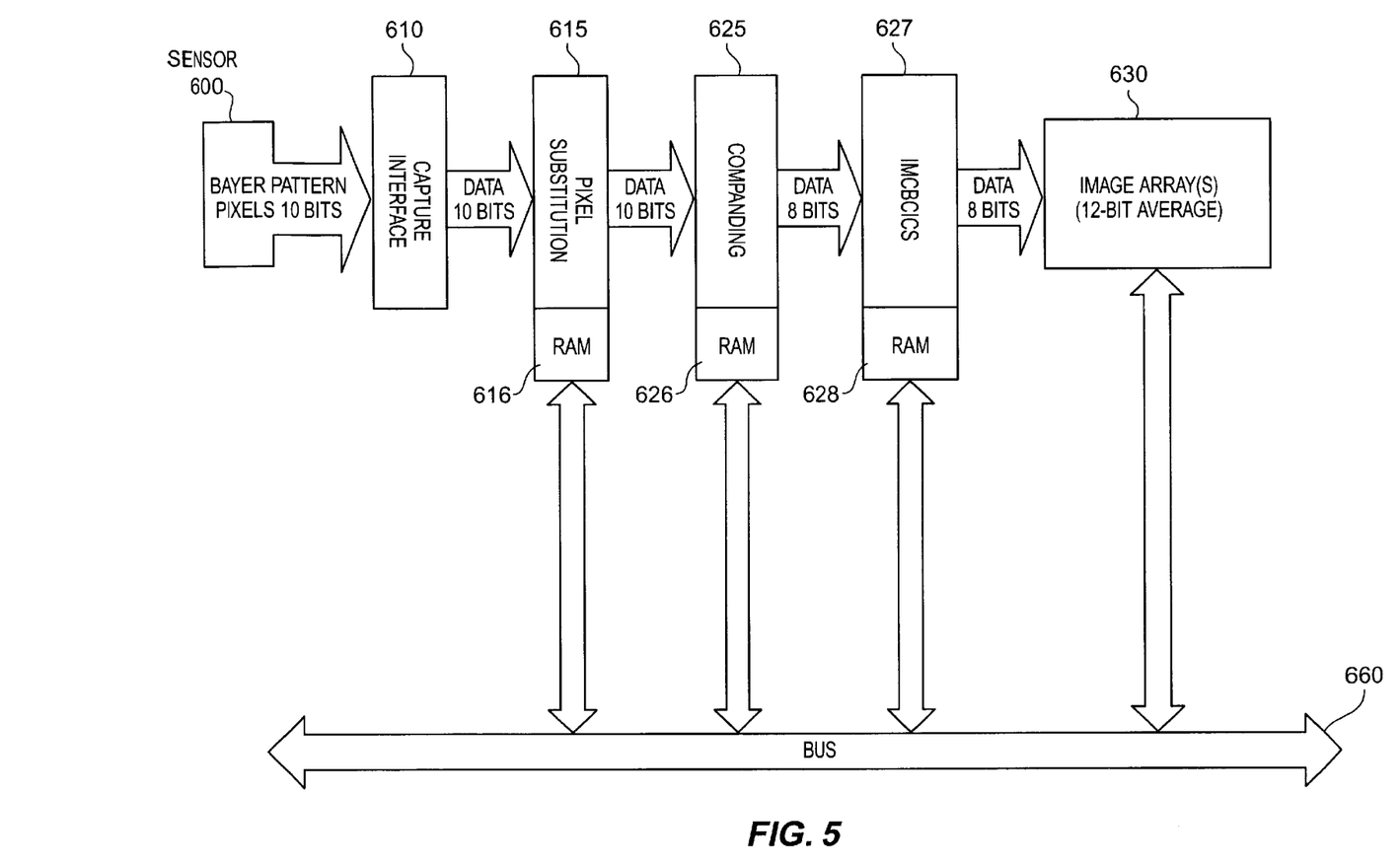
FIG. 5 is a block diagram of an image processing apparatus according to an embodiment of the invention.

FIG. 5 is a block diagram of an image processing apparatus according to an embodiment of the invention.

FIG. 5 is a block diagram of internal image processing and compression components of an imaging device incorporating at least one embodiment of the invention. In the exemplary circuit of FIG. 5, a sensor 600 generates pixel components which are color/intensity values from some scene/environment. The 10-bit pixel values generated by sensor 600 are sent to a capture interface 610. Sensor 600 in the context relating to the invention will typically sense one of either R, G, or B components from one "sense" of an area or location. Thus, the intensity value of each pixel is associated with only one of three color planes and may form together a Bayer pattern such as that shown in FIG. 1(*a*). Capture interface 610 resolves the image generated by the sensor and assigns values to the individual pixels. The set of all such pixels for the entire image is in a Bayer pattern in accordance with at least one of the embodiments of the invention.

It is typical in any sensor device that some of the pixel cells in the sensor plane may not respond to the lighting condition in the scene/environment properly. As a result, the pixel values generated from these cell may be defective. These pixels are called "dead pixels." The "pixel substitution" unit 615 replaces each dead pixel by the immediate previously valid pixel in the row.

A RAM table 616 consists of the row and column indices of the dead pixels, which are supplied by the sensor. This RAM table 616 helps to identify the location of dead pixels in relation to the captured image. Companding module 625 is circuit designed to convert each original pixel of 10-bit intensity captured from the sensor to an 8-bit intensity value. Companding module 625 is not needed if the sensor 600 and capture interface 610 provide an 8-bit per-pixel value.

According to at least one embodiment of the invention, as described above, the 8-bit value for each pixel may be directly converted (after companding) from its Bayer pattern single color component form (R, G and B) into a 12-bit YCrCb image space. This integrated technique may be implemented as hardware as shown in FIG. 5. An integrated median computation-based color interpolation and color space conversion module (IMCBCICS) 627 is coupled to companding module 625 and can receive therefrom 8-bit pixel data values. Each 8-bit value can be converted directly by module 627 into either Y, Cr, or Cb components as appropriate. Since the integrated technique envisions differing formulas depending on the position of the pixel in the image array, flip-flops and other such state change mechanisms may be provided in module 627. A set of two flip-flops, one indicating row position and another indicating column position can be used to track whether a pixel lies on an even or odd row or column. Accordingly, these control signals and state signals may be used in selecting appropriate coefficients as specified by the formulas #1 through #6 described above. Also, RAM table 628 can be used to store coefficients for each formula or to store neighboring pixel values needed in executing the integrated technique. For example, formula #1 generates a Y component and only a Y component by utilizing 4 neighboring G color plane pixels and the input pixel Rij. As input pixels are received by module 627, they can be stored temporarily in RAM table 628 and flushed after the component(s) value has been utilized in the computation formulas for which they are required. Thus, module 627 will also consist of Read/Write logic that will facilitate the storage and retrieval of pixel values as desired. Further, add and multiply units can be provided in module 627 to carry out the necessary arithmetic computations. To perform the sorting operation needed for determining the median, a set of comparators and programmable registers may be employed. The registers can form a queue whose entries are reordered based on the output of the comparators. For odd row, odd column pixels, module 627 will be designed to provide three sets of outputs (one for each Y, Cr and Cb component). These outputs which represent the 12-bit YCrCb converted image component values can be written to at least one image array(s) 630. As discussed above, the image array(s) 630 is at most M*N*12 bits in total capacity where M*N is the size of the captured image in rows and columns. By contrast, the prior art would have needed first a M*N*24 bit size image array capacity to perform intermediate conversion and interpolation steps (see FIGS. 1(a)–1(c)).

Further, the need to decimate a 24-bit YCrCb image space to attain a 12-bit YCrCb space would require additional circuitry and temporary storage of the entire image in 24-bit YCrCb form. In designing module 627, a RAM table 628 would need only to store, for each row of pixels being sensed and then converted, a maximum of two other rows of pixels.

A RAM table 626 may accompany companding module 625 and be used to look up, for each 10-bit value, a corresponding 8-bit mapped value. Thus, each pixel in the Bayer pattern will become an 8-bit value, associated with one of the three color planes.

Each of the RAM tables 616, 626 and 628 can directly communicate with bus 660 so that their data can be loaded and then later, if desired, modified. Further, those RAM tables and other RAM tables may be used to store scaled image data or intermediate result data as needed. Though the individual components (selectors, shifters, registers, add, multiply units and control/address signals) of module 627 have not been detailed, one skilled in the art will readily be able to implement such a device, following the logic of the flow diagram set forth in FIG. 3.

Figure 6:
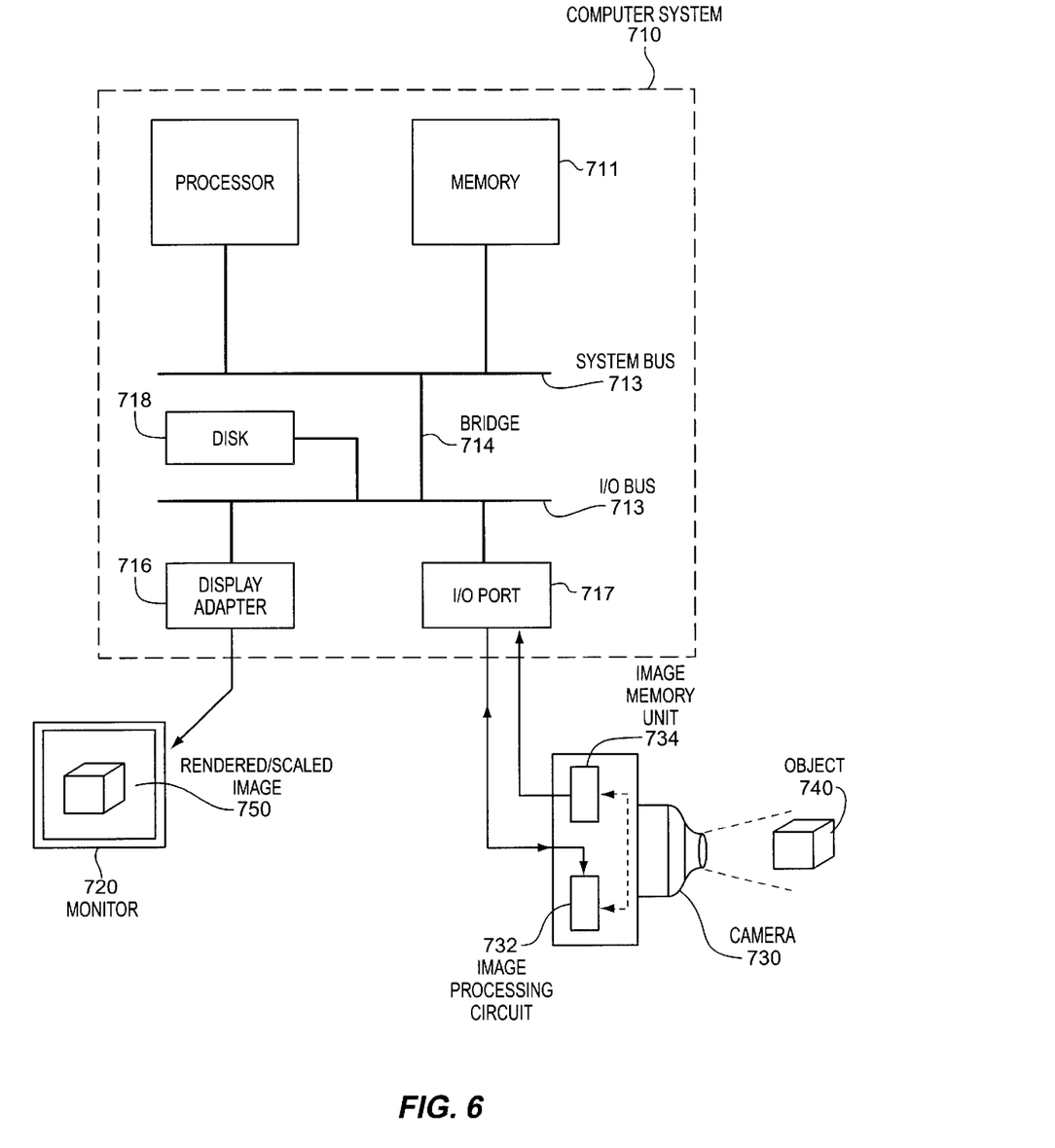
FIG. 6 is a system diagram of one embodiment of the invention.

FIG. 6 is a system diagram of one embodiment of the invention.

Illustrated is a computer system 710, which may be any general or special purpose computing or data processing machine such as a PC (personal computer), coupled to a camera 730. Camera 730 may be a digital camera, digital video camera, or any image capture device or imaging system, or combination thereof and is utilized to capture an image of an object/scene 740. Essentially, captured images are processed by an image processing circuit 732 so that they can be efficiently stored in an image memory unit 734, which may be a ROM, RAM or other storage device such as a fixed disk. The image contained within image memory unit 734 that is destined for computer system 710 can be according to one embodiment of the invention, stored directly as a 12-bit YCrCb image space as opposed to an 24-bit color interpolated RGB image space. In most digital cameras that can perform still imaging, images are stored first and downloaded later. This allows the camera 730 to capture the next object/scene quickly without additional delay. The invention in its various embodiments, particularly in providing a 12-bit YCrCb image that is directly converted from the captured 8-bit Bayer pattern, reduces the storage requirements of the camera 730 and thus, the costs associated with that storage allowing for a more inexpensive camera. Further, in imaging applications where it is known a priori that YCrCb format is desired, such as in outputting the image to an analog signal rendering device (such as television), the image can be directly downloaded from camera 730 without modification or further processing.

The image processing circuit 732 carries out the integrated median computation-based color interpolation and color space conversion directly from the Bayer pattern sense (with other intermediate steps such as pixel substitution or companding, see FIG. 5 and associated description) of camera 730 in this embodiment of the invention. When a color space converted and interpolated image is downloaded to computer system 710, it may be rendered to some output device such as a printer (not shown) or to a monitor device 720. If, according to one embodiment of the invention, the image is in 12-bit YCrCb format, it may need to be converted back to an RGB format. Conversion of the YCrCb image may be achieved using a processor 712 such as the Pentium® (a product of Intel Corporation) and a memory 711, such as RAM, which is used to store/load instruction addresses and result data.

In an alternate embodiment, the integrated median computation-based color space conversion and color interpolation described above may be achieved in a software application running on computer system 710 rather than directly in camera 730. In such an embodiment, the image processing circuit may advantageously store only the 8-bit Bayer patter image. The application(s) used to perform the integrated median computation-based color interpolation and color space conversion after download from camera 730 may be from an executable compiled from source code written in a language such as C++. Advantageously, as desired, a q sort or shell sort or other sorting technique may be implanted in the application(s) executed on computer system 710 in order to determine medians. The instructions of that executable file, which correspond with instructions necessary to scale the image, may be stored to a disk 718 or memory 711. Further, such application software may be distributed on a network or a computer-readable medium for use with other systems. It would be readily apparent to one of ordinary skill in the art to program a computing machine to perform integrated color space conversion and color interpolation upon an image if the methodology described above is followed. Further, the various embodiments of the invention may be implemented onto a video display adapter or graphics processing unit that provides color space conversion and color interpolation in an integrated single step as described above. When an image, such as an image of a scene 740, is captured by camera 730, it is sent to the image processing circuit 732. Image processing circuit 732 consists of ICs and other components which execute, among other functions, the integrated median computation-based color interpolation and color space conversion of an image. The scaling operation, as described earlier, may utilize image memory unit to store the original 12-bit YCrCb image space that results from the processing. Once all pixels are processed and transferred to the computer system 710 for rendering, the camera 730 is free to capture the next image. When the user or application desires/requests a download of images, the imaged stored in the image memory unit, whether stored as YCrCb images or as Bayer pattern images, are transferred from image memory unit 734 to the I/O port 717. I/O port 717 uses the bus-bridge hierarchy shown (I/O bus 715 to bridge 714 to system bus 713) to temporarily store the YCrCb image data into memory 711 or, optionally, disk 718. Computer system 710 has a system bus 713 which facilitates information transfer to/from the processor 712 and memory 711 and a bridge 714 which couples to an I/O bus 715. I/O bus 715 connects various I/O devices such as a display adapter 716, disk 718 and an I/O port 717, such as a serial port. Many such combinations of I/O devices, buses and bridges can be utilized with the invention and the combination shown is merely illustrative of one such possible combination.

In one embodiment of the invention, the YCrCb images can converted back to full resolution RGB space on computer system 710 by suitable application software (or hardware), which may utilize processor 712 for its execution. The RGB image data may then be rendered visually using a display adapter 716 into a rendered/scaled image 750. Since color interpolation and color space conversion are readily facilitated on-camera in one embodiment of the invention, it may be possible to implement a communication port in camera 730 that allows the image data to be transported directly to the other devices such as an analog device that renders in YCrCb rather than in RGB.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are accordingly to be regarded as illustrative rather than restrictive.

What is claimed is:

1. A method for converting pixels of an image, wherein each of the pixels has at least one color value, into a luminance and a chrominance color space comprising the steps of:

determining a position of each of the pixels in the image as a row position and a column position;

for each of the pixels, determining a luminance value for a specific pixel using the color values for pixels, in the neighborhood of the specific pixel;

for a subset of each of the pixels, determining a chrominance value for a specific subset pixel using the color values for pixels in the neighborhood of the specific subset pixel and applying a different operation depending upon the row position of the pixel; and mapping the luminance and chrominance values into a luminance and chrominance color space.

2. A method according to claim 1 wherein the pixels of the image consist of raw image pixels.

3. A method according to claim 1 wherein the pixels of the image are arranged in a Bayer pattern.

4. A method according to claim 1 wherein the neighborhood of a pixel includes the pixel.

5. A method according to claim 1 wherein the neighborhood of a pixel includes pixels positioned no more than one row or column position away from the pixel.

6. A method according to claim 1 wherein determining a luminance value includes applying a different operation depending upon the row position of the pixel.

7. A method according to claim 6 wherein each of the pixels has either a red, green or blue color value and wherein determining a luminance value for a pixel location having a red color value includes determining a median of the green color values in the neighborhood of the red pixel, determining a median of the blue color values in the neighborhood of the red pixel, weighting the medians and the color value of the red pixel and adding the weighted medians and red color value to obtain the luminance.

8. A method according to claim 6 wherein each of the pixels has either a red, green or blue color value and wherein determining a luminance value for a pixel location having a blue color value includes determining a median of the green color values in the neighborhood of the blue pixel, determining a median of the red color values in the neighborhood of the blue pixel, weighting the medians and the blue color value for the blue pixel and adding the weighted medians and blue color value to obtain the luminance.

9. A method according to claim 1 wherein each of the pixels has either a red, green or blue color value and wherein determining a chrominance value for a pixel location having a green color value includes determining a median of the green color values in the neighborhood of the green pixel, determining a median of the blue color values in the neighborhood of the green pixel, determining a median of the red color values in the neighborhood of the green pixel, weighting the medians and adding the weighted medians to obtain the chrominance.

10. A method according to claim 9 wherein the subset of each of the pixel values excludes each of the pixels that does not have an odd row number position and an odd column number position so that only a Y component is generated for all other pixels in the luminance and chrominance color space.

11. A method according to claim 1, wherein for each pixel having an odd-numbered row and column position, determining a luminance value includes applying a different operation depending upon the row position of the pixel.

12. A method according to claim 1 wherein the subset of each of the pixels comprises each of the pixels that has an odd row number position and an odd column number position so that a Y, Cr and Cb component is generated for each of the pixels having an odd row number position and an odd column number position in the luminance and chrominance color space.

13. A method according to claim 1 wherein determining a luminance value for a specific pixel comprises using a median of the color values for pixels in the neighborhood of the specific pixel.

14. A method according to claim 1 wherein determining a chrominance value for a specific subset pixel comprises using a median of the color values for pixels in the neighborhood of the specific subset pixel.

15. A machine-readable medium having stored thereon data representing sequences of instructions which, when executed by a processor, cause the processor to perform the steps of:

determining a position of each of the pixels in an image, each pixel having at least one color value, as a row position and a column position;

for each of the pixels, determining a luminance value for a specific pixel using the color values for pixels in the neighborhood of the specific pixel;

for a subset of each of the pixels, determining a chrominance value for a specific subset pixel using the color values for pixels in the neighborhood of the specific subset pixel and applying a different operation depending upon the row position of the pixel; and mapping the luminance and chrominance values into a luminance and chrominance color space.

16. A medium according to claim 15 wherein the neighborhood of a pixel includes the pixel.

17. A medium according to claim 15 wherein the neighborhood of a pixel includes pixels positioned no more than one row or column position away from the pixel.

18. A medium according to claim 15 wherein determining a luminance value includes applying a different operation depending upon the row position of the pixel.

19. A medium according to claim 15 wherein each of the pixels has either a red, green or blue color value and wherein determining a luminance value for a pixel location having a red color value includes determining a median of the green color values in the neighborhood of the red pixel, determining a median of the blue color values in the neighborhood of the red pixel, weighting the medians and the color value of the red pixel and adding the weighted medians and red color value to obtain the luminance.

20. A medium according to claim 15 wherein each of the pixels has either a red, green or blue color value and wherein determining a luminance value for a pixel location having a blue color value includes determining a median of the green color values in the neighborhood of the blue pixel, determining a median of the red color values in the neighborhood of the blue pixel, weighting the medians and the blue color value for the blue pixel and adding the weighted medians and blue color value to obtain the luminance.

21. A medium according to claim 15 wherein each of the pixels has either a red, green or blue color value and wherein determining a chrominance value for a pixel location having a green color value includes determining a median of the green color values in the neighborhood of the green pixel, determining a median of the blue color values in the neighborhood of the green pixel, determining a median of the red color values in the neighborhood of the green pixel, weighting the medians and adding the weighted medians to obtain the chrominance.

22. A medium according to claim 15 wherein, for each pixel having an odd-numbered row and column position, determining a luminance value includes applying a different operation depending upon the row position of the pixel.

23. A medium according to claim 15 wherein the subset of each of the pixels comprises each of the pixels that has an odd row number position and an odd column number position so that a Y, Cr and Cb component is generated for each of the pixels having an odd row number position and an odd column number position in the luminance and chrominance color space.

24. A method according to claim 15 wherein the subset of each of the pixel values excludes each of the pixels that does not have an odd row number position and an odd column number position so that only a Y component is generated for all other pixels in the luminance and chrominance color space.

25. A method according to claim 15 wherein determining a luminance value for a specific pixel comprises using a median of the color values for pixels in the neighborhood of the specific pixel.

26. A method according to claim 15 wherein determining a chrominance value for a specific subset pixel comprises using a median of the color values for pixels in the neighborhood of the specific subset pixel.

* * * * *

UNITED STATES PATENT AND TRADEMARK OFFICE
CERTIFICATE OF CORRECTION

PATENT NO. : 6,356,276 B1
DATED : March 12, 2002
INVENTOR(S) : Acharya

It is certified that error appears in the above-identified patent and that said Letters Patent is hereby corrected as shown below:

<u>Column 5,</u>
Line 62, delete "B'i j=median ($B_{i-1, j-1}$, $B_{i-1, j+1}$, $B_{i+1, j-1}$),", insert
-- B'i j=median ($B_{i-1, j-1}$, $B_{i-1, j+1}$, $B_{i+1, j+1}$, $B_{i+1, j-1}$), --.

<u>Column 8,</u>
Line 28, before "$0.114B_{I,j}$", delete "30", insert -- + --.

Signed and Sealed this

Eighteenth Day of June, 2002

*Attest:*

JAMES E. ROGAN
*Attesting Officer*     *Director of the United States Patent and Trademark Office*